United States Patent [19]

Bolosky et al.

[11] Patent Number: 6,118,790
[45] Date of Patent: Sep. 12, 2000

[54] AUDIO SERVER SYSTEM FOR AN UNRELIABLE NETWORK

[75] Inventors: William J. Bolosky, Issaquah; Steven P. Levi, Redmond; Mark D. VanAntwerp; Yoram Bernet, both of Seattle, all of Wash.

[73] Assignee: Microsoft Corporation, Redmond, Wash.

[21] Appl. No.: 08/667,095

[22] Filed: Jun. 19, 1996

[51] Int. Cl.[7] .................................................. H04J 3/16
[52] U.S. Cl. ................................. 370/468; 348/7
[58] Field of Search .................... 370/352, 353, 370/354, 355, 356, 468, 470, 473, 465; 348/7, 13; 709/213, 214, 215, 216

[56] References Cited

U.S. PATENT DOCUMENTS

| | | | |
|---|---|---|---|
| 5,473,362 | 12/1995 | Fitzgerald et al. | 348/7 |
| 5,553,063 | 9/1996 | Dickson . | |
| 5,608,786 | 3/1997 | Gordon . | |
| 5,610,841 | 3/1997 | Tavaka et al. | 364/514 R |
| 5,706,281 | 1/1998 | Hashimoto et al. | 370/470 |
| 5,754,553 | 5/1998 | Shimoda | 370/471 |
| 5,754,773 | 5/1998 | Ozden et al. | 370/468 |

FOREIGN PATENT DOCUMENTS

| | | | |
|---|---|---|---|
| 0 674 414 A2 | 9/1995 | European Pat. Off. | H04L 29/06 |
| WO 96/17306 | 6/1996 | European Pat. Off. | G06F 15/16 |
| WO 96/17451 | 6/1996 | European Pat. Off. | H04H 1/02 |
| WO 97/22201 | 6/1997 | European Pat. Off. . | |

OTHER PUBLICATIONS

Bolosky, William J. et al., "The Tiger Video Fileserver," *Technical Report MSR–TR–96–09*, Microsoft Research Advanced Technology Division, Microsoft Corporation, Apr. 1996, pp. 1–9.

"Multimedia Audio on Demand," *IBM Technical Disclosure Bulletin*, vol. 37, No. 06B, Jun. 1994, pp. 451–460.

Lougher, Phillip, Shepard, Doug, and Pegler, David, "The Impact of Digital Audio and Video on High–Speed Storage," *Proceedings of the Symposium on Mass Storage Systems*, Jun. 12–16, 1994, pp. 84–89.

Bolot, Jean–Chrysostome and Vega–Garcia, André, "Control Mechanisms for Packet Audio in the Internet," *Proceedings of IEEE Infocom 1996*, Mar. 24–28, 1996, pp. 232–239.

Patterson, David A., et al., "Introduction to Redundant Arrays of Inexpensive Disks (RAID)", *IEEE*, 1989, pp. 112–117.

Berson, Steven, et al., "Staggered Striping in Multimedia Information Systems", *SIGMOD 94*, Association of Computing Machinery, Minneapolis, Minnesota, May 1994, pp. 79–90.

Ozer, Jan, "Sound Blasts the Web", *PC Magazine*, Mar. 26, 1996, pp. 103–105, 108, 113, 116, 118, 121–122, 125, 127–128.

González, Sean, "Sound Foundations: Audio on the Web", *PC Magazine*, Mar. 26, 1996, pp. 209, 211.

*Primary Examiner*—Huy D. Vu
*Attorney, Agent, or Firm*—Leydig, Voit & Mayer, Ltd.

[57] ABSTRACT

An audio server system is provided that sends audio sequences or mixed audio and still-picture sequences to subscribers at their request. To be used as an audio server system in the Internet environment, the audio server system must overcome the Internet's excessive loss of packets. The audio server system overcomes this problem by allowing for pre-specified packet sizes and pre-specified data rates. By allowing for pre-specified packet sizes, the audio server system can utilize an error correction scheme, such as parity encoding, so as to reduce the effects of the Internet's excessive loss of packets. Pre-specified data rates are provided by the audio server system so as to ensure that audio sequences or mixed audio sequences are not played faster than intended, which may lead to an increase in system data loss.

12 Claims, 8 Drawing Sheets

6,118,790

AUDIO SERVER SYSTEM FOR AN UNRELIABLE NETWORK

TECHNICAL FIELD

The present invention relates generally to data processing systems and, more particularly, to an audio server system for an unreliable network.

BACKGROUND OF THE INVENTION

The Internet is an interconnection of many smaller networks. Each network transfers data in the form of packets and uses the well-known technique of packet switching. The protocol used for such functionality is the Internet protocol. Since the number of people using the Internet is continually increasing, the number of services provided over the Internet, such as electronic mail, is also increasing to keep up with the demand. Thus, it is desirable to create new services for use with the Internet. However, in creating a new service for use with the Internet, a significant problem must be overcome. That is, the Internet has a high rate of packet loss and as such, any new service must be implemented so as to overcome this problem.

SUMMARY OF THE INVENTION

The audio server system described herein sends audio sequences and mixed audio and still-picture sequences across the Internet to subscribers. The Internet is an unreliable network in that it has a high rate of packet loss. Although the Internet has a high rate of packet loss, the audio server system provides for the use of an error-tolerant file format to reduce the effect of the packet loss and the audio server system allows for the use of variable rate data streams so as to reduce the number of packets lost.

To overcome the high packet loss rates of the Internet, the audio server system allows the packet size of a file to be specified at the time the file is written to disk. Specifying the packet size in advance of transmission allows the file to be encoded in accordance with any of a number of well-known error correction schemes, such as parity encoding. Use of such an error correction scheme provides for the reconstruction of a lost packet so that the audio stream is unaffected by the packet loss. In other words, by using the error correction scheme, a subscriber can reconstruct a lost packet from the contents of the packets that were received.

The audio and mixed audio streams sent by the audio server system typically have varying data rates. Although some conventional server systems could send audio and mixed-audio data, all data would be sent at the same data rate (i.e., the maximum data rate), which leads to server idle time. That is, the conventional systems send the data as blocks of data over a reserved, fixed time period and blocks having a small data rate require less than the reserved amount of time to send the data. Hence, in this situation, after sending the data, the conventional server system waits idly for the next time period. Although the server system incurring idle time is not in itself a problem, in order to incur such idle time, the server system must have had to send the data at a rate faster than it was intended, which is sometimes referred to as sending a burst of data. Sending a burst of data can overwhelm the receiver of the data if they do not have sufficient buffering capability, thereby leading to data loss. Moreover, sending a burst of data sometimes leads to an increase in data loss by the Internet since the Internet may have insufficient buffering capability. Of course, it is desirable to reduce such data losses. The audio server system described herein has the ability to send streams at variable data rates so as to prevent server idle time which reduces data loss. The audio server system provides this ability by specifying the data rate at the time the file is written to disk and then transmitting the data at this data rate.

In accordance with a first aspect of the present invention, a method in a continuous media server system is provided. The continuous media server system has a plurality of storage devices for sending an audio sequence to a subscriber. The continuous media server system stripes the audio sequence across the plurality of storage devices, receives a data rate that specifies a rate at which the audio sequence is sent to the subscriber, and sends the audio sequence from the storage devices to the subscriber at the data rate.

In accordance with a second aspect of the present invention, a method is provided in a continuous media server system. The continuous media server system has a plurality of storage devices for sending an audio sequence to a subscriber. The continuous media server system divides the audio sequence into a plurality of blocks, and stripes the blocks across the plurality of storage devices. The continuous media server system also receives a packet size that specifies a maximum amount of data contained in each packet that is used for sending each block of the audio sequence, and sends the blocks from the storage devices to the subscriber such that each of the blocks is sent as a plurality of packets with each packet containing an amount of data equivalent to or less than the packet size.

DETAILED DESCRIPTION OF THE INVENTION

Figure 1:
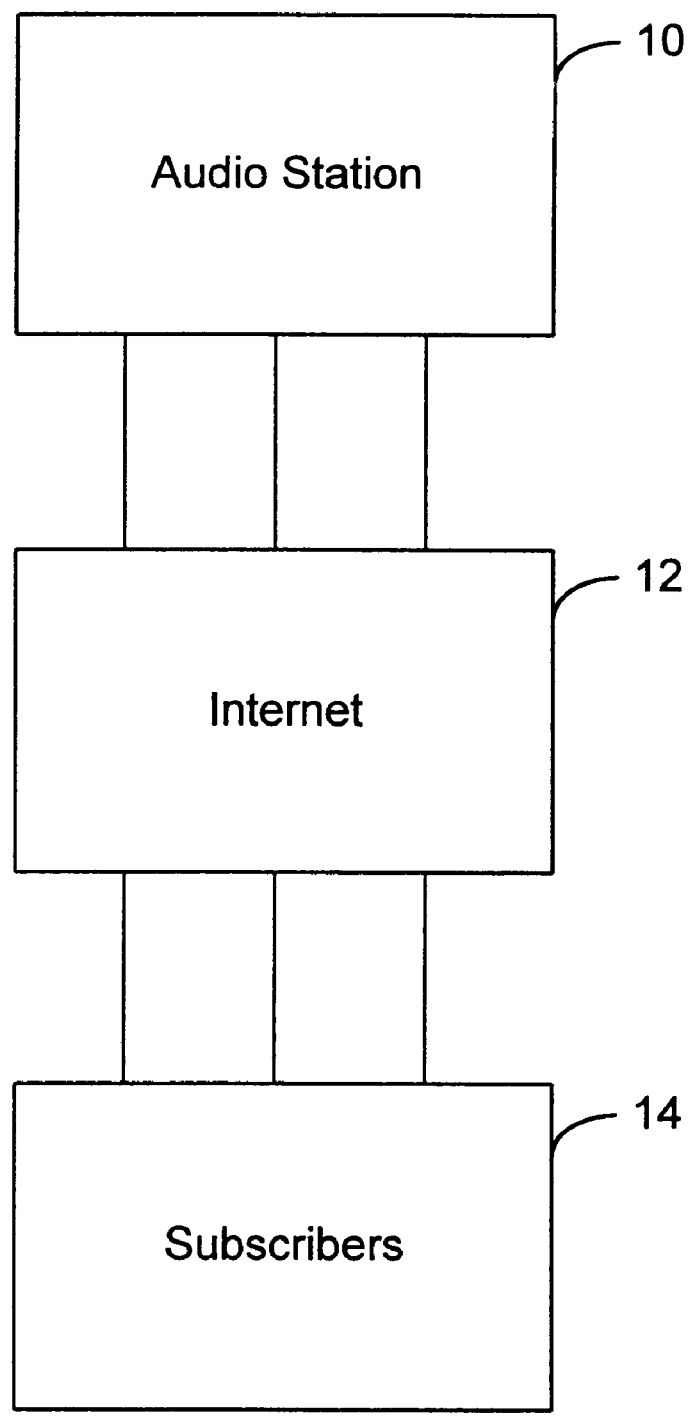
FIG. 1 is a block diagram of an audio server system of a preferred embodiment of the present invention.

The preferred embodiment of the present invention sends audio sequences and mixed audio and still-picture sequences (hereafter "mixed audio") across the Internet to subscribers. Although the Internet has a high rate of packet loss, the preferred embodiment allows for the use of an error-tolerant file format to reduce the effect of the packet loss and the preferred embodiment also allows for the use of variable rate data streams so as to reduce the number of packets lost. The system described in the present disclosure is known as the audio server system. The audio server system is a type of continuous media server system where data is sent to a consumer at a guaranteed rate. Using the audio server system, a subscriber can request either an audio sequence or a mixed audio sequence and the audio server system will send the requested sequence to the subscriber at a guaranteed rate.

In order to be used over the Internet, the audio server system must account for the high packet losses of the Internet. Specifically, the Internet can lose between 1 in 10 and 1 in 3 packets. To overcome this problem, the audio server system allows the packet size of a file to be specified at the time the file is written to disk. Specifying the packet size in advance of transmission allows the file to be encoded in accordance with any of a number of well-known error correction schemes, such as parity encoding, which is further discussed below. Use of such an error correction scheme provides for the reconstruction of a lost packet so that the audio stream is unaffected by the packet loss. In other words, by using the error correction scheme, a subscriber can reconstruct a lost packet from the contents of the packets that were received.

The audio and mixed audio streams sent by the audio server system typically have varying data rates. Although some conventional server systems could send audio and mixed-audio data, all data would be sent at the same data rate (i.e., the maximum data rate), which leads to server idle time. That is, the conventional server system sends the data as blocks of data over a reserved, fixed time period and blocks having a slow data rate require less than the reserved amount of time to send the data. Hence, in this situation, after sending the data, the conventional server system waits idly for the next time period. Although the server system incurring idle time is not in itself a problem, in order to incur such idle time, the server system must have had to send the data at a rate faster than it was intended, which is sometimes referred to as sending a burst of data. Sending a burst of data can overwhelm the receiver of the data if they do not have sufficient buffering capability, thereby leading to data loss. Moreover, sending a burst of data sometimes leads to an increase in data loss by the Internet since the Internet may have insufficient buffering capability. Of course, it is desirable to reduce such data losses. The audio server system described below has the ability to send streams at variable data rates so as to prevent server idle time which reduces data loss. The audio server system provides this ability by specifying the data rate at the time the file is written to disk and then transmitting the data at this data rate.

The audio server system is depicted in FIG. 1. The audio server system is a system in which subscribers may request at any point in time to listen to particular audio sequences (or listen to and view mixed audio sequences) transmitted from the audio station 10. The audio station 10 transmits the data for the audio sequences over the Internet 12 to the subscribers 14. Alternatively, instead of the Internet, another suitable interconnection mechanism can be used. The audio station 10 preferably makes available a large number of different audio or mixed audio sequences that may be transmitted to the subscribers 14 and both listened to and viewed in real time. For purposes of clarity, hereafter, the description of the audio server system will be provided with reference to only audio sequences, although it is intended that mixed audio sequences could be referred to as well. In other words, the processing described below is described relative to audio sequences, but is equally applicable to mixed audio sequences. Additionally, one skilled in the art will appreciate that other data can be used by the audio system of the preferred embodiment including video data and other forms of multimedia data.

In the audio server system, the choice of audio sequence listened to by a subscriber is not pre-scheduled. Rather, the choice is scheduled upon subscriber demand. A subscriber need not choose an audio sequence that other subscribers are listening to; instead, the subscriber may choose from any of the available audio sequences. Furthermore, each subscriber chooses when he wishes to start listening to an audio sequence. A number of different subscribers 14 may be concurrently listening to different portions of the same audio sequence. A subscriber may select where in a sequence he desires to start listening and can stop listening to a sequence before the entire sequence has been played.

Figure 2:
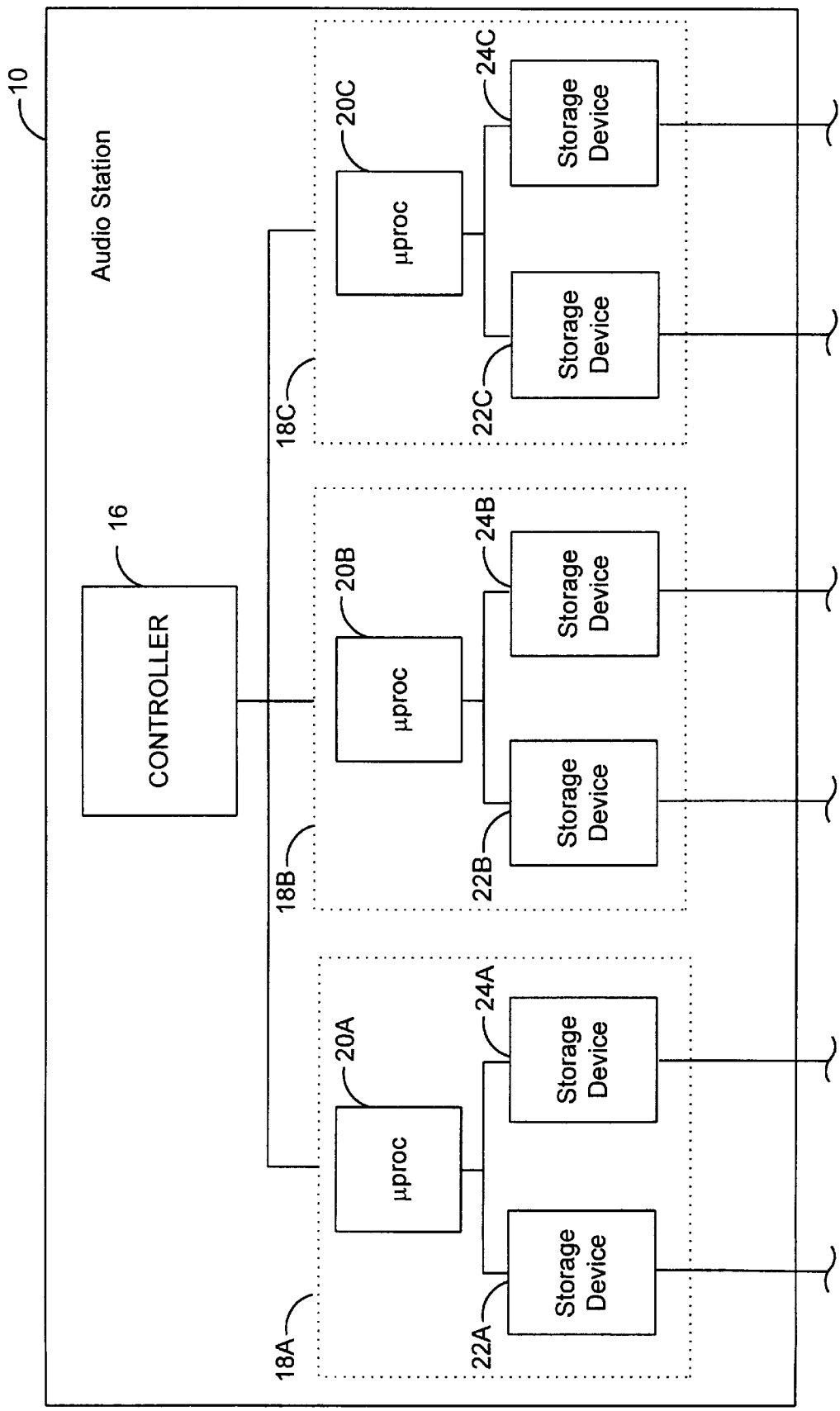
FIG. 2 is a more detailed block diagram of the audio station of FIG. 1.

FIG. 2 is a block diagram showing the audio station 10 in more detail. The audio station 10 includes a controller 16 that is responsible for scheduling transmission of audio sequences to subscribers 14 (FIG. 1). The controller 16 controls several subsystems 18A, 18B, and 18C and is responsible for scheduling and directing output from the subsystems to subscribers 14. The controller may be duplicated to provide a backup controller that enhances the fault tolerance of the system. Although only three subsystems are shown in FIG. 2, those skilled in the art will appreciate that, in most instances, it is more suitable to employ a larger number of subsystems. Only three subsystems are shown in FIG. 2 for purposes of simplicity and clarity.

Each subsystem 18A, 18B, and 18C includes a microprocessor 20A, 20B, and 20C that is responsible for controlling respective pairs of storage devices (22A, 24A), (22B, 24B) and (22C, 24C). The data for the audio sequences that are available to the subscribers 14 are stored on the storage devices 22A, 24A, 22B, 24B, 22C and 24C. Each subsystem 18A, 18B, and 18C need not include two storage devices, rather each subsystem may include only one storage device or may, alternatively, include more than two storage devices. The microprocessors 20A, 20B, and 20C are responsible for cooperating with the controller 16 to transmit the data for the audio sequences stored on the storage devices to the subscribers 14.

Storage devices 22A, 22B, 22C, 24A, 24B and 24C may be, for instance, magnetic disk drives or optical disk drives. Those skilled in the art will appreciate that any suitable storage device may be used for storing the data for the audio sequences. For instance, RAM, masked ROM, EPROM and flash EPROMs may be used to store the audio sequences in the present invention.

Figure 3:
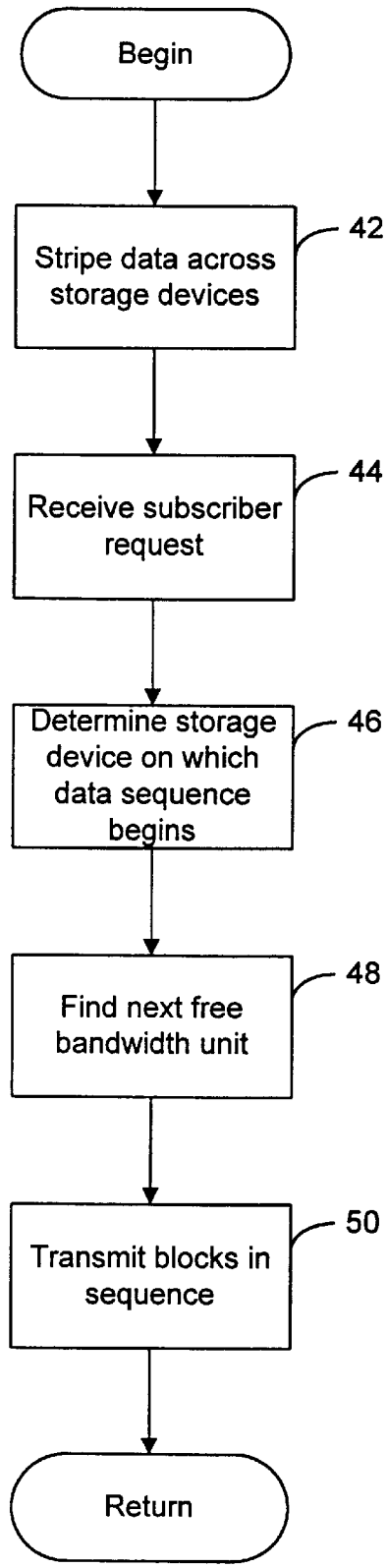
FIG. 3 is a flowchart providing a high level view of the steps performed by the audio server system.

FIG. 3 is a flowchart of steps performed by the preferred embodiment of the present invention. Initially, audio sequences are stored across (i.e., striped) the storage devices 22A, 22B, 22C, 24A, 24B, and 24C (FIG. 2) of the audio server system (step 42 in FIG. 3). Multiple copies of an audio sequence may be stored in the audio station 10. This step is likely only performed once for each copy of an audio sequence stored in the audio station 10 and is not repeated for each subscriber. The motivation for striping the data of the audio sequences is to increase the efficiency with which data is output by the storage devices in a bounded amount of time and to balance load requirements on each storage device.

Figure 4:
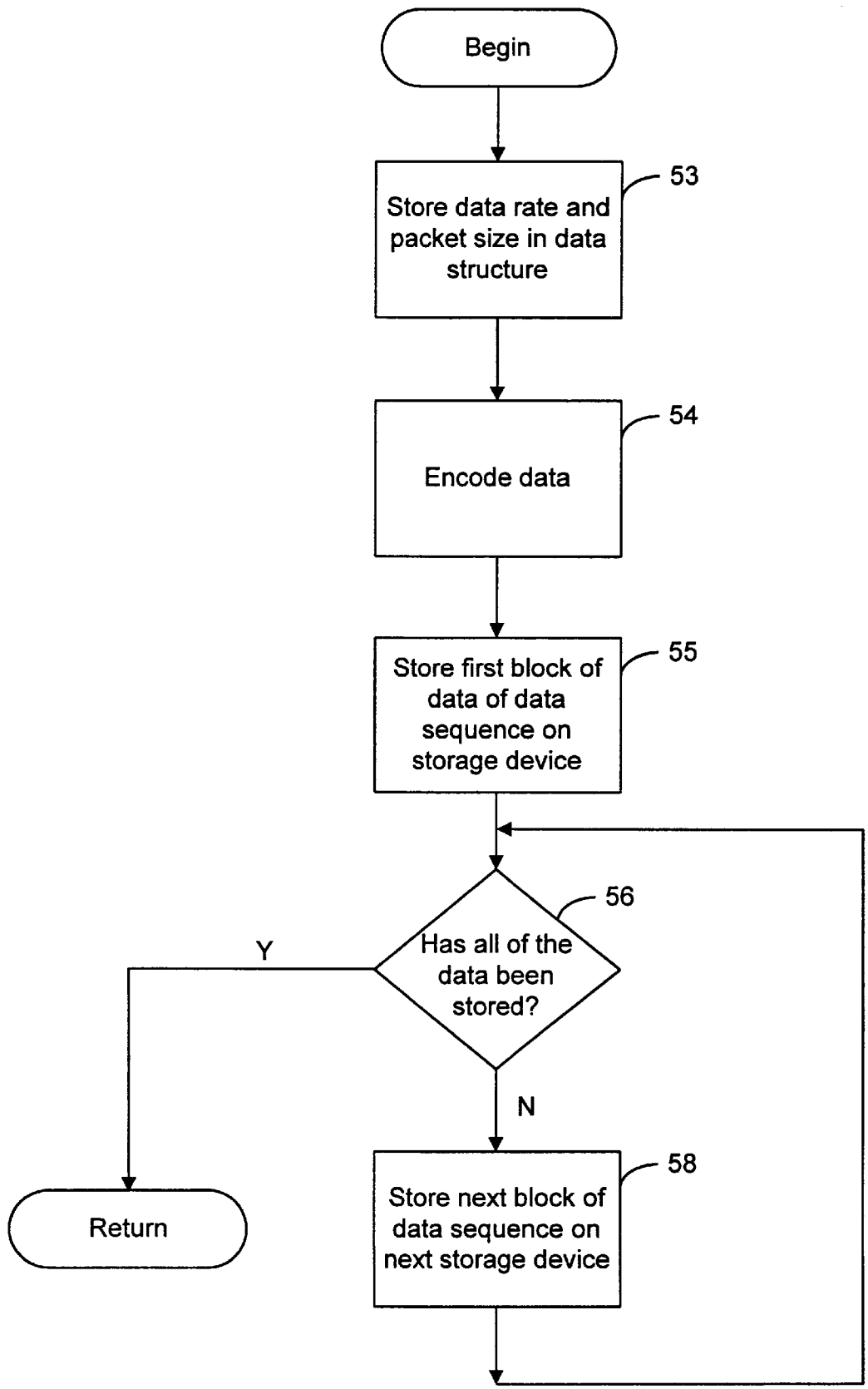
FIG. 4 is a flowchart illustrating in more detail how audio sequences are stored in the audio server system.
Figure 5A:
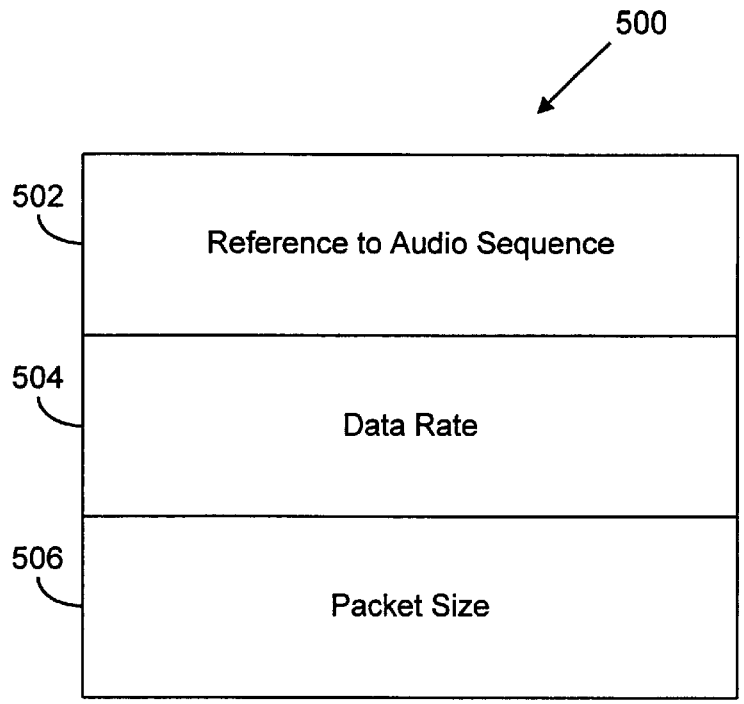
FIG. 5A depicts a data structure maintained by the audio server system for each audio sequence.

FIG. 4 is a flowchart showing the steps performed by the audio server system to stripe the audio sequences across the storage devices 22A, 22B, 22C, 24A, 24B and 24C (i.e., to perform step 42 of FIG. 3). The first step performed is to store the data rate and the packet size for each audio sequence in a data structure associated with that audio sequence (step 53). The administrator of the audio server system knows the rate at which the audio sequence should be played and specifies this rate as the data rate (e.g., 8 kb/s). The data rate identifies the minimum rate at which the audio sequence should be sent. Although the audio sequence could be sent faster, sending the audio sequence slower than the data rate would negatively affect the quality of its play (i.e., the sound would be distorted). The packet size is specified by the administrator in a manner described below so as to facilitate the use of an error correction scheme. Both the data rate and the packet size are stored in the data structure depicted in FIG. 5A. In FIG. 5A, the data structure 500 is depicted for a particular audio sequence referred to by reference 502. The reference 502 to the audio sequence may be, for example, the title of a song. Associated with the referenced audio sequence is a data rate 504 and a packet size 506. The data rate 504 specifies the rate at which the audio sequence should be played (i.e., sent to the subscriber). The packet size 506 specifies the maximum amount of data to be contained in a packet sent to the subscriber via the Internet 12. The use of such a packet size 506 allows for the packet size to be known before transmission which facilitates the use of an error correction scheme with the audio sequence. One skilled in the art will appreciate that the data structure 500 may contain other information that is relevant to the audio sequence, such as the size of the audio sequence.

In an alternative embodiment, the data rate and the packet size may be specified by the subscriber and sent with their request for an audio sequence. By allowing the subscriber to designate the data rate, the subscriber may be able to utilize the data faster in situations where they have sufficient buffering capabilities and they know that the Internet will not be affected by the increased data rate. By allowing the subscriber to specify the packet size, the subscriber can dynamically request larger or smaller packet sizes when it knows that the network would perform better with the new size. By specifying a larger packet size as a multiple of the original packet size or a smaller packet size as an even divisor of the original packet size, the error correction aspects of the audio server system can still be realized.

Figure 5B:
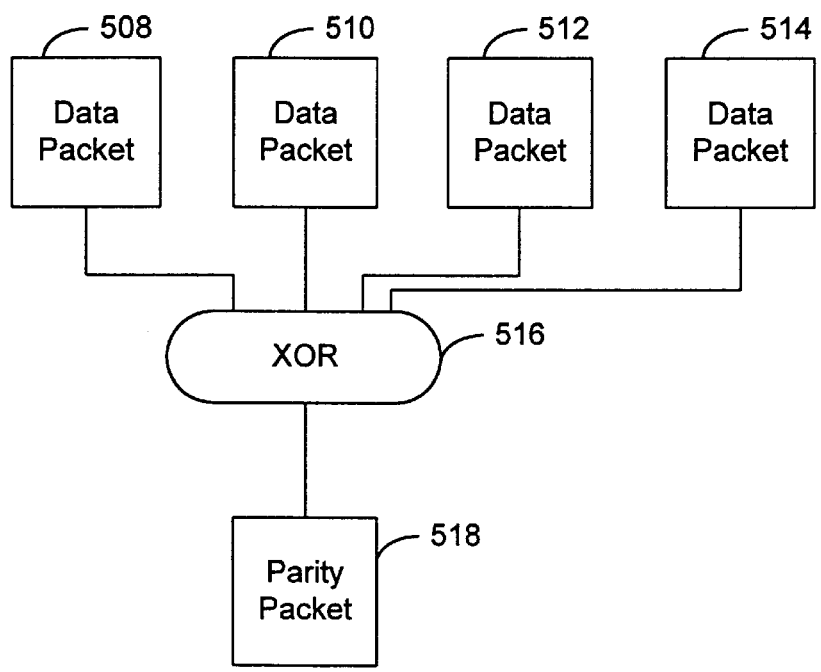
FIG. 5B depicts an error correction scheme utilized by the audio server system.

After storing the data rate and the packet size, the audio sequence is encoded using an error correction scheme so that the loss of one or more packets during transmission over the Internet 12 can be tolerated by the subscriber (step 54). That is, using one of a number of well-known error correction schemes, the subscriber can reconstruct the contents of the lost packet from the packets that were received. An example of such an error correction scheme is the well-known scheme of parity encoding. A parity encoding scheme provides that a parity packet is sent after a fixed number of data packets. For example, a four data packet parity encoding scheme transmits four data packets followed by a parity packet containing sufficient information so as to be able to reconstruct the contents of any one of the four data packets. The use of four data packets is merely illustrative and one skilled in the art will appreciate that either more or fewer data packets can be used. In encoding the data according to the parity encoding scheme, the audio sequence is divided into a number of packets where each packet contains an amount of data equivalent to the packet size 506. For each sequential four data packets, a parity packet is created whose bits represent an exclusive ORing of the bits in the four data packets. That is, each bit in the four data packets having the same bit position are exclusively ORed together and the result of this Boolean operation is stored at the corresponding bit location in the parity packet. The parity encoding scheme is depicted in FIG. 5B which shows that the four data packets 508, 510, 512 and 514 are exclusively ORed 516 together to create the parity packet 518. Using this parity encoding scheme, if during the transmission of the four data packets 508, 510, 512 and 514 and the parity packet 518, an error were to occur such that data packet 508 did not arrive at the subscriber, its contents can be reconstructed. Such a reconstruction occurs by exclusively ORing the data packets 510, 512 and 514 that were received with the parity packet 518, which results in the contents of the data packet 508. The parity encoding scheme helps overcome the significant packet losses of the Internet 12.

In addition to parity encoding, other encoding schemes can be utilized that would lessen the effect of a lost packet. That is, when sending a still picture, the data can be packetized in a manner that renders the received data usable. For example, if the still picture were packetized such that each packet stored one square area of the picture, when a packet is lost, the received picture would have an obvious hole. However, other encoding schemes can be used to lessen this effect. For instance, if the still picture were to be sent as 12 packets, each packet could contain the data for each twelfth row of pixels. Therefore, if a packet were lost, the received picture would still be usable with the loss being barely noticeable. Furthermore, the subscriber may have a system that estimates the data contained in the missing rows which would make the data loss even less noticeable. One skilled in the art will appreciate that there are numerous other encoding schemes that could be utilized so as to lessen the effect of lost data in conjunction with the audio server system of the preferred embodiment.

After encoding the data, the data is treated as one contiguous stream of data even though it represents a number of groups of data packets and associated parity packets. This contiguous stream of data is then viewed as a number of sequential blocks. Block size is variable, but typically, a block includes 64 kilobytes to 4 megabytes of data. Block size is bounded by an upper limit that may not be exceeded. These sequential blocks are then striped across the storage devices of all of the subsystems 18A, 18B and 18C in steps 55–58. The first block of an audio sequence is stored on a designated storage device (step 55). As mentioned above, it should be appreciated that more than one copy of an audio sequence may be striped across the storage devices. As such, there may be more than one storage device upon which each block of the audio sequence is stored. After the first block of the audio sequence has been stored on the designated storage device, a determination is made if all of the blocks of data for the audio sequence have already been stored on the storage devices (step 56). If not, the next block of data for the audio sequence is stored on a next storage device in a predetermined sequence of storage devices (step 58). Each consecutive block of data for the audio sequence is stored on a next storage device in the predetermined sequence. Steps 56 and 58 are then repeated until all of the data for the audio sequence has been stored across the storage devices. The predetermined sequence wraps around to the beginning when the end of the sequence is reached. As a result of this process, the data for the audio sequence is striped across the storage devices. The steps shown in FIG. 4 are performed for each audio sequence that is stored in the audio server system of the preferred embodiment of the present invention.

After the completion of step 42 in FIG. 3 of storing the audio sequence, the audio station 10 receives a subscriber request to listen to an audio sequence (step 44). In the alternative embodiment, as part of this step, both the data rate and the packet size are received from the subscriber and stored in the data structure 500. In response to the subscriber request, the audio server system determines how to exploit the available output bandwidth to service the subscriber's request. Bandwidth, as used in this context, is intended to refer to the input/output capacity (for a fixed time frame) of storage devices that hold data for audio sequences. The audio server system is described relative to an implementation that concerns output bandwidth (i.e., reading data from storage devices holding audio sequences), but those skilled in the art will appreciate that the present invention may also be applied to input bandwidth as well (i.e., writing audio sequence data to storage devices). The first step in exploiting the available bandwidth is determining the drive on which the initial block to be listened to in the audio sequence is stored (step 46). If the subscriber is listening to the audio sequence from the beginning of the sequence, the initial block is the first block in the sequence. However, where the subscriber desires to listen to the audio sequence beginning at some intermediate point, the initial block is the first block to which the subscriber desires to listen. The audio server system maintains a record (described in more detail below) of the storage devices on which each of the available audio sequences begins and more generally, has sufficient knowledge to locate the initial block to be listened to by the subscriber. This information is utilized to perform step 46 of FIG. 3.

Once the storage device that holds the initial block of the requested audio sequence to be listened to has been identified (i.e., step 46), the audio server system finds the next free bandwidth unit that may be used to transmit the data of the requested audio sequence to the requesting subscriber (step 48). The bandwidth unit is the unit of allocation of bandwidth of the audio server system. Scheduling for each storage device is done on a column of time slots. Each column includes a number of time slots in a sequence that repeats. Each time slot is a bounded period of time that is sufficient for the storage device to output a block of data. A bandwidth unit comprises a time slot from each column of time slots. Each time slot in the bandwidth unit is associated with a different storage device that outputs a block of data of an audio sequence. Since the blocks of data are striped across the storage device, consecutive blocks of data are read from the predetermined sequence of storage devices during the sequence of time slots of the bandwidth unit. The time slots are generated by the microprocessors 20A, 20B and 20C or other suitable mechanism (FIG. 2).

Figure 6:
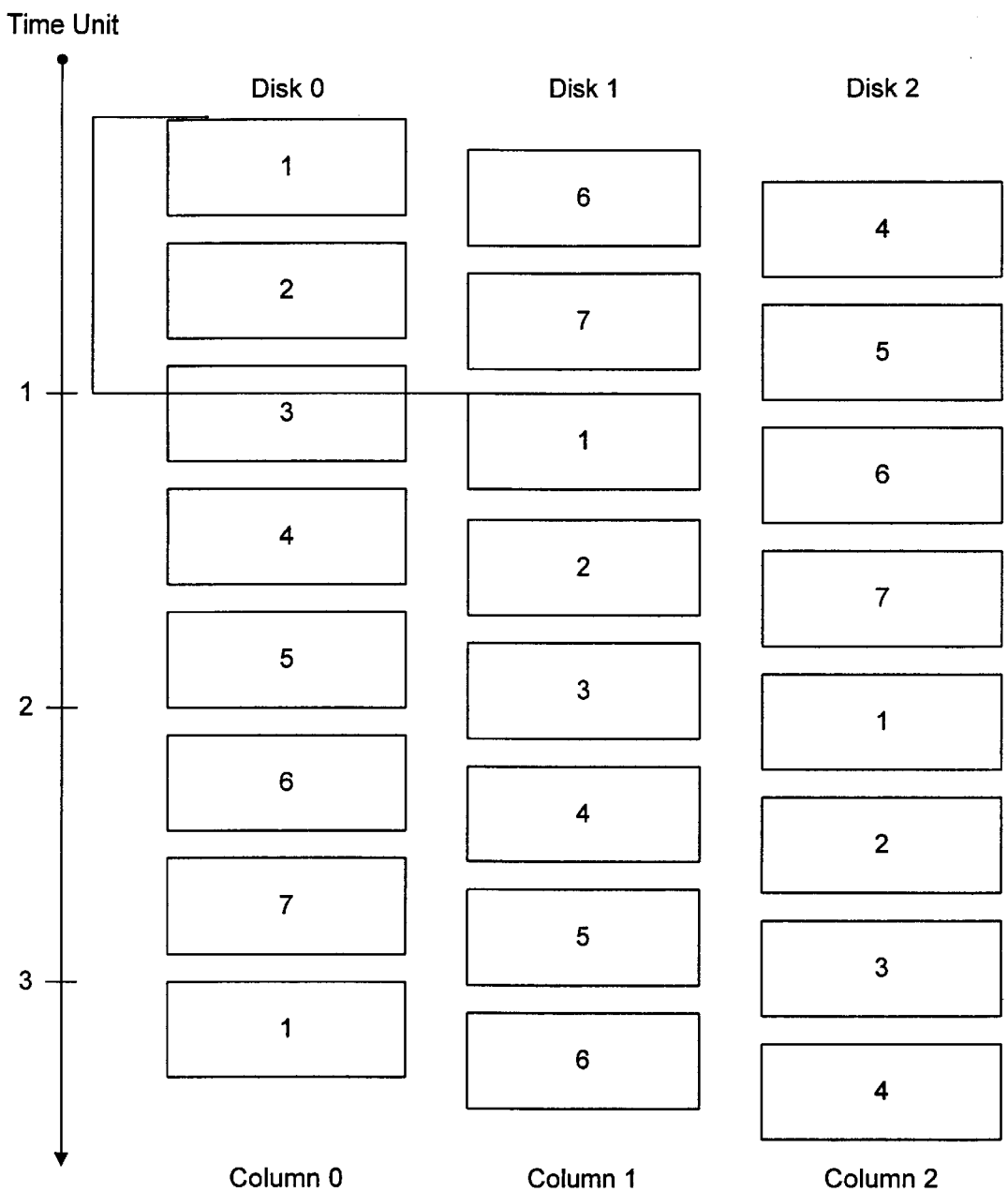
FIG. 6 is a diagram illustrating the scheduling of bandwidth in a three disk drive system by the audio server system.

The notions of a column of time slots and a bandwidth unit can perhaps best be explained by way of example. Subscribers are scheduled by bandwidth unit. In other words, they are granted the same numbered time slot in each column. FIG. 6 shows the scheduling of seven subscribers for three storage devices (e.g., disk 0, disk 1 and disk 2). The rectangles shown in FIG. 6 are time slots. The numbers 1–7 in FIG. 6 correspond to the time slot in the respective columns 0, 1 and 2. Time slots of a common bandwidth unit all have the same number. Columns 0, 1 and 2 are all offset temporally relative (i.e., time unit in FIG. 6) to each other, but each column has the same sequence of time slots. As can be seen in FIG. 6, disk drive 0 services each of the subscribers in sequence beginning with the subscriber who has been allocated logical unit of bandwidth 1. In the example of FIG. 6, bandwidth unit I includes the time slots labeled 1 in columns 0, 1 and 2. During the slot 1 of column 0, disk drive 0 begins outputting a block of data for an audio sequence to a first subscriber that has been assigned bandwidth unit 1. One time unit later, disk drive 1 outputs the next block of data to the first subscriber during time slot 1 of column 1. Further, at time unit 2, disk drive 2 outputs the next block of data for the audio sequence to the subscriber during time slot 1 of column 2. The predefined sequence of storage devices in this example is disk drive 0, disk drive 1 and disk drive 2, with the sequence wrapping back around to disk drive 0 from disk drive 2. As mentioned above, the audio server system, in step 48 of FIG. 3, finds the next free bandwidth unit that may be allocated to a subscriber to transmit the desired audio sequence to the subscriber. In particular, the audio server system finds the next free time slot on the storage device that holds the initial block to be listened to of the audio sequence. The scheduling in the other columns follows in lock step with the scheduling of the column for this storage device.

Figure 7:
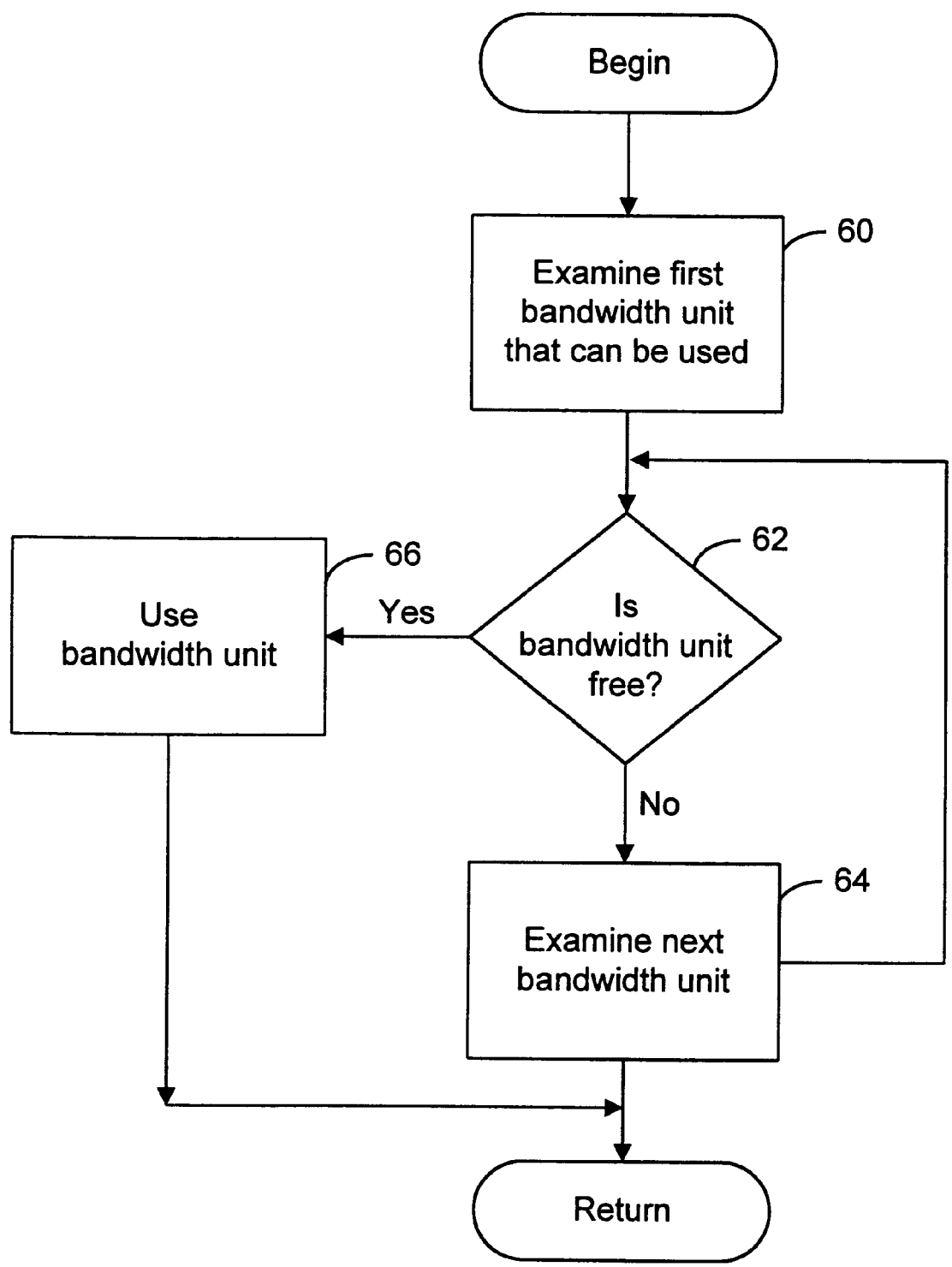
FIG. 7 is a flowchart illustrating the steps performed to locate a bandwidth unit to be allocated to service a subscriber request by the audio server system.
Figure 8:
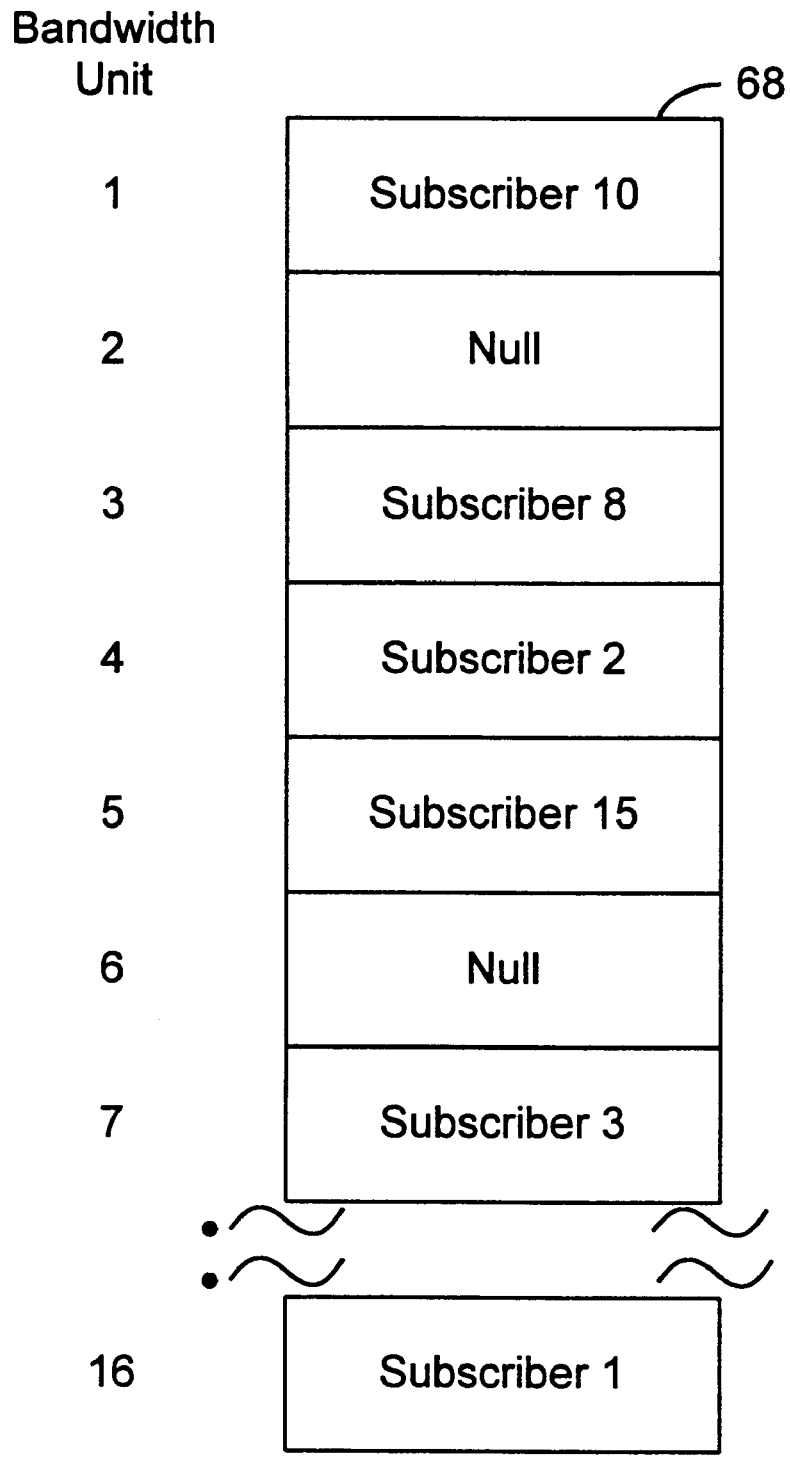
FIG. 8 is a diagram illustrating an example data structure that is maintained by the audio server system.

FIG. 7 is a flowchart of the steps performed by the audio server system to find the next free bandwidth unit in step 48. Before delving into the steps of FIG. 7, it is helpful to first introduce a data structure maintained by the system to assist in monitoring bandwidth units. In particular, the preferred embodiment maintains a data structure 68 such as an array, linear list or tree (FIG. 8) for each of the logical units of bandwidth in the system. An entry is provided in the data structure 68 for each of the bandwidth units. The data structure may be stored in memory or some other devices. In the example shown in FIG. 8, there are 16 bandwidth units. Each entry holds either a pointer to the subscriber that is currently allocated the bandwidth unit or a null pointer, which indicates that the bandwidth unit has not yet been allocated. This structure may alternatively be viewed as holding an assignment of time slots to subscribers since each column of time slots follows the same sequence.

As shown in FIG. 7, the first step in finding a free bandwidth unit is to perform a calculation to determine the first bandwidth unit that can be next used, given the current time frame. There is an inherent delay between when a free bandwidth unit is found and when the free logical bandwidth unit can actually be used to output data which must be accounted for in the determination. In step 60 of FIG. 7, the present invention accounts for clock granularity, communication delay between the microprocessors 20A, 20B and 20C, and delay for blocks of data to be read in locating the next bandwidth unit that should also be considered. Given this calculation, the audio server system determines the first bandwidth unit that can be used to output the requested audio sequence to the subscriber (if the bandwidth unit is not already allocated). The found bandwidth unit is examined, and it is determined whether the bandwidth unit is free (step 62). Hence, in step 62 of FIG. 7, the data structure 68 is examined for the found bandwidth unit to determine if it holds a null entry. If the entry for the found bandwidth unit holds a null entry, the found bandwidth unit is free and is used (step 66). On the other hand, if the found bandwidth unit is not free (i.e., it holds a pointer to a subscriber), the entry for the next bandwidth unit is examined to determine if it is free (step 64). In other words, the entry for the next bandwidth unit in sequence held in the data structure 68 (FIG. 8) is examined. Step 62 is then repeated as described above. This process is repeated until a free bandwidth unit is found. By adopting this approach, the audio server system assures that any free portion of the available bandwidth may be assigned to a subscriber without undue delay.

Once the free bandwidth unit is found, the subscriber is assigned the free bandwidth unit and the blocks of data of the audio sequence are transmitted in sequence (step 50 in FIG. 3). The blocks are divided into a number of packets, where each packet contains no more than the amount of data specified in the packet size 506 entry of the data structure 500, and the packets are sent by the audio server system at the specified data rate 504. Typically, each packet will contain an amount of data specified by the packet size 506, except that the last packet of the audio sequence may contain less. The cycle is repeated until all the data is output or until the user requests to stop listening to the audio sequence. It should be appreciated that scheduling may be dynamic such that over time users may enter and leave the system and users may start and stop listening to audio sequences. Moreover, it should be appreciated that steps 44, 46, 48 and 50 are performed on a per-subscriber basis. Thus, the subscriber receives the desired data.

Those skilled in the art will appreciate that the present invention may also be applied to the writing of data onto storage devices from subscribers or other data sources. The same steps of dividing scheduling into bandwidth units are performed and during the allocated time slots data is written onto the storage devices rather than read from the storage devices.

While the present invention has been described with reference to a preferred embodiment thereof, those skilled in the art will appreciate the various changes in form and detail may be made without departing from the spirit and scope of the present invention as defined in the appended claims. For instance, other storage media may be used and different quantities of storage media may be used. In addition, the sequence of storage devices may vary from that shown. Still further, approaches to monitoring assignment of bandwidth units which differ from the linear list described above may be used. In addition, the approach of the present invention is also applicable to guaranteeing input bandwidth.

We claim:

1. A method in a continuous media server system for sending an audio sequence to a subscriber in such a manner as to reduce transmission errors, the continuous media server system having a plurality of storage devices, the method comprising the steps of:

striping the audio sequence as a set of blocks across the plurality of storage devices;

establishing a length of time available for sending the blocks of the audio sequence to the subscriber via a transmission medium;

establishing that the audio sequence can be sent to the subscriber via the transmission medium in a minimum length of time; and effectively sending the blocks of the audio sequence from the storage devices to the subscriber via the transmission medium over substantially the entire available length of time, so that the audio sequence is sent during a length of time longer than the minimum length of time necessary for the transmission medium.

2. The method of claim 1 wherein the available length of time is an amount of time needed by the subscriber to play the audio sequence.

3. The method of claim 1, further including the step of encoding the audio sequence in an error-tolerant format before striping the audio sequence.

4. The method of claim 1, further including the steps of:

striping a second audio sequence across the plurality of storage devices;

determining that the second audio sequence can be sent to the subscriber via the transmission medium in a second length of time shorter than the available length of time, the second length of time distinct from the length of time in which the audio sequence can be sent to the subscriber via the transmission medium; and sending the second audio sequence from the storage devices to the subscriber via the transmission medium during the entire available length of time.

5. The method of claim 1 wherein the continuous media server system is connected to the subscriber via an Internet and wherein the step of sending the audio sequence includes sending the audio sequence to the subscriber via the Internet.

6. The method of claim 1 wherein the continuous media server system has a still picture and wherein the step of sending the audio sequence includes sending the still picture to the subscriber.

7. A method in a continuous media server system having a plurality of storage devices for sending an audio sequence to a client, comprising the steps of:

striping the audio sequence across the plurality of storage devices;

receiving from the client an indication of a length of time over which the audio sequence is to be sent to the client;

determining that the audio sequence can be sent to the client in a length of time shorter than the indicated length of time; and sending the audio sequence from the storage devices to the client over substantially the indicated length of time.

8. A computer-readable medium whose contents cause a continuous media server system having a plurality of storage devices to send a first audio sequence to a first subscriber and a second audio sequence to a second subscriber, by performing the steps of:

striping the first audio sequence across the plurality of storage devices;

receiving a first request from the first subscriber for the first audio sequence;

determining a first predetermined amount of time over which the first audio sequence is to be sent, the first amount of time longer than a minimum amount of time needed to send the first audio sequence to the first subscriber;

sending the first audio sequence from the storage devices to the first subscriber over substantially the first amount of time;

striping the second audio sequence across the plurality of storage devices;

receiving a second request from the second subscriber for the second audio sequence;

determining a second predetermined amount of time over which the second audio sequence is to be sent, the second amount of time longer than a minimum amount of time needed to send the second audio sequence to the second subscriber; and sending the second audio sequence from the storage devices to the second subscriber over substantially the second amount of time.

9. A continuous media server system comprising:

a plurality of storage devices for storing an audio sequence; and a server connected to a packet switched network to be used for sending the audio sequence to a subscriber as a plurality of packets, the server further comprising:

a first component for striping the audio sequence across the storage devices;

a second component for determining a length of time available for sending the striped audio sequence to the subscriber that is greater than a minimum amount of time needed to send the striped audio sequence, for receiving a packet size specifying a maximum amount of data in each packet, and for receiving a request from the subscriber for the audio sequence; and a third component for dividing the striped audio sequence into the packets such that each packet contains an amount of data equivalent to or less than the packet size, and for sending the packets via the packet switched network to the subscriber over substantially the determined length of time.

10. The continuous media server system of claim 9 wherein a still picture is stored and sent with the striped audio sequence.

11. The continuous media server system of claim 9 wherein the packet switched network is an Internet.

12. The continuous media server system of claim 9 wherein the first component encodes the audio sequence using a parity encoding scheme before striping the audio sequence.

* * * * *

UNITED STATES PATENT AND TRADEMARK OFFICE
CERTIFICATE OF CORRECTION

PATENT NO.   : 6,118,790                                   Page 1 of 1
DATED        : September 12, 2000
INVENTOR(S)  : Bolosky et al.

It is certified that error appears in the above-identified patent and that said Letters Patent is hereby corrected as shown below:

<u>Column 7,</u>
Line 60, "I" should read -- 1 --.

Signed and Sealed this

Sixteenth Day of December, 2003

JAMES E. ROGAN
*Director of the United States Patent and Trademark Office*